(12) United States Patent
Garg et al.

(10) Patent No.: US 8,239,447 B2
(45) Date of Patent: Aug. 7, 2012

(54) RETRIEVING DATA USING AN ASYNCHRONOUS BUFFER

(75) Inventors: Manish Garg, Santa Clara, CA (US);
Martin H. Stein, El Granada, CA (US);
Martin W. Steiner, San Francisco, CA (US)

(73) Assignee: SAP AG, Walldorf (DE)

( * ) Notice: Subject to any disclaimer, the term of this patent is extended or adjusted under 35 U.S.C. 154(b) by 1434 days.

(21) Appl. No.: 11/024,562

(22) Filed: Dec. 28, 2004

(65) Prior Publication Data

US 2006/0140202 A1    Jun. 29, 2006

(51) Int. Cl.
*G06F 15/16* (2006.01)
*G06F 12/00* (2006.01)
*H04L 12/56* (2006.01)

(52) U.S. Cl. ........ 709/203; 709/231; 711/100; 711/169; 370/412

(58) Field of Classification Search .................. 709/203, 709/231; 370/412; 711/100, 169
See application file for complete search history.

(56) References Cited

U.S. PATENT DOCUMENTS

| | | | |
|---|---|---|---|
| 6,256,676 B1* | 7/2001 | Taylor et al. | 709/246 |
| 6,748,481 B1* | 6/2004 | Parry et al. | 711/100 |
| 2002/0194609 A1* | 12/2002 | Tran | 725/95 |
| 2003/0025716 A1* | 2/2003 | Colavin | 345/684 |
| 2005/0132417 A1* | 6/2005 | Bobrovskiy et al. | 725/134 |
| 2006/0022842 A1* | 2/2006 | Zoladek et al. | 340/870.07 |

* cited by examiner

*Primary Examiner* — Haresh N Patel
*Assistant Examiner* — Peter Shaw
(74) *Attorney, Agent, or Firm* — Schwegman, Lundberg & Woessner, P.A.

(57) ABSTRACT

A mechanism for retrieving data over a network using an asynchronous buffer is described herein. According to one embodiment, an exemplary process includes, in response to a request for first data from a client via a first thread, determining whether a local circular buffer contains the requested first data, the local circular buffer having a head region and a tail region for identifying a head and a tail of the local circular buffer respectively, and the local circular buffer containing a portion of a data file maintained by a server over a network, generating a second thread to the server over the network to request the first data, if the local circular buffer does not contain the requested first data, and returning the first thread to the client while waiting for a result of the second thread from the server. Other methods and apparatuses are also described.

19 Claims, 18 Drawing Sheets

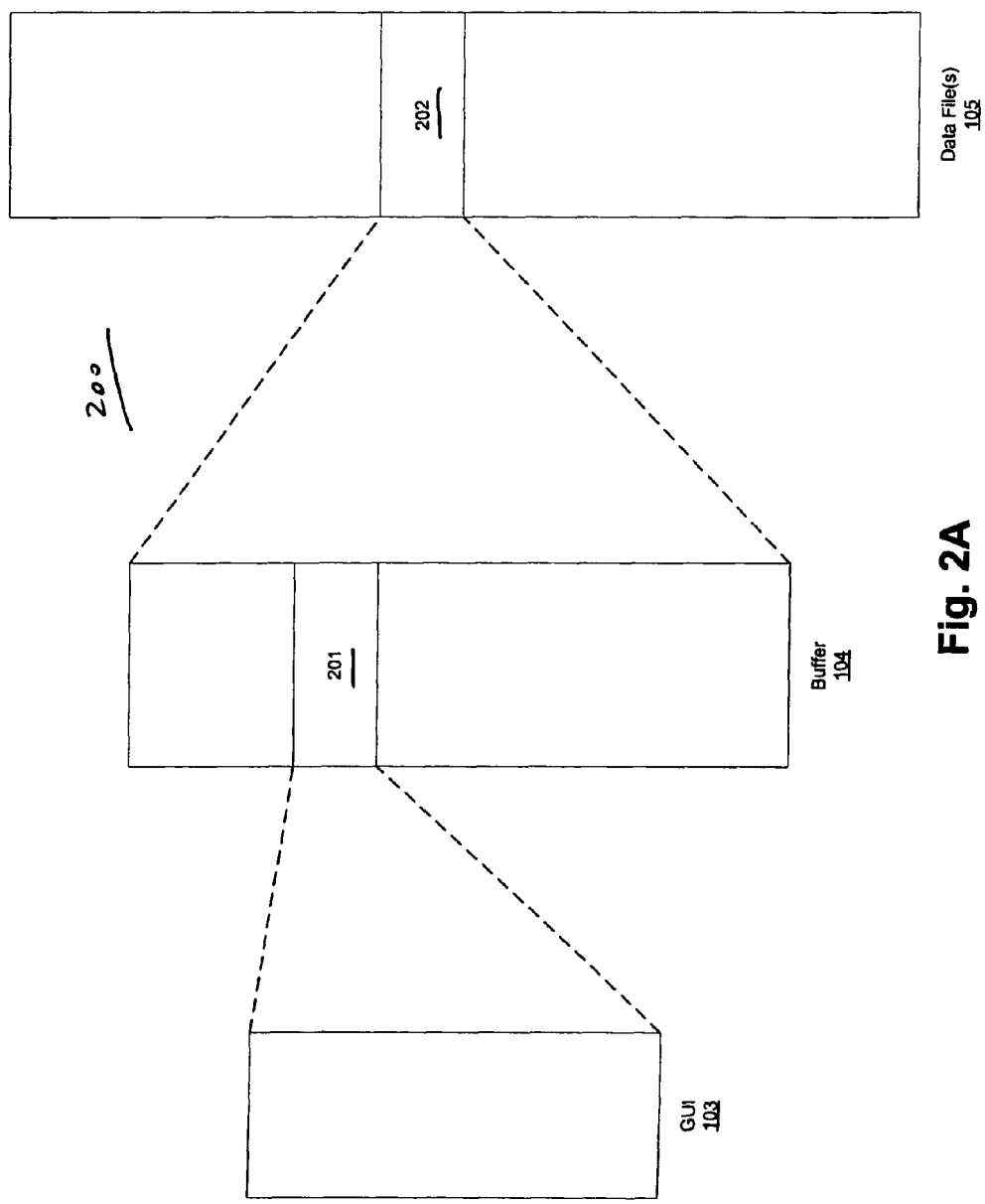

RETRIEVING DATA USING AN ASYNCHRONOUS BUFFER

FIELD OF THE INVENTION

The present invention relates generally to network computing. More particularly, this invention relates to retrieving data over a network using an asynchronous buffer.

BACKGROUND OF THE INVENTION

Logging is employed within virtually all data networks. "Logging" refers generally to recording network-related and/or application-related information in response to one or more predefined network/application events. For example, when an end-user opens a TCP connection to a server, or unsuccessfully attempts to gain access to network resources (e.g., by attempting to log in to a particular server), this information is typically recorded as an entry within a log file. Similarly, if a variable within an application rises above a specified threshold value, a log entry indicating the value and the date and time that the threshold value was exceeded may be stored within a log file. Logging techniques may be employed to record any specified network/application event. Network administrators may then review the log files to identify security issues and/or troubleshoot network problems.

Java 2 Enterprise Edition (J2EE) is a tool commonly used in software development today for developing enterprise applications. Generally, J2EE reduces the costs and complexity associated with developing multi-tier enterprise services. Another advantage of J2EE is that it can be relatively rapidly deployed and enhanced as the need arises. J2EE is currently used in many large-scale application development projects for these reasons.

As application development projects grow larger, logging becomes increasingly more important and complicated. Typically, a log file can be viewed by a client, such as an administrator using a viewing graphical user interface (GUI). However, the viewing GUI can only display a portion of the log file. As a result, the clients have to perform their own buffer management. In addition, it may take a long time in order to retrieve the log data over a network. Hence, a minimal amount of data should be transmitted over the network.

In an enterprise computing environment, such as J2EE environment, a Java swing table model is typically used. However, such implementation is limited to the Java swing table and the Java swing table is carried in a synchronous manner which may hold up the client's operation.

SUMMARY OF THE INVENTION

A mechanism for retrieving data over a network using an asynchronous buffer is described herein. According to one embodiment, an exemplary process includes, in response to a request for first data from a client via a first thread, determining whether a local circular buffer contains the requested first data, the local circular buffer having a head region and a tail region for identifying a head and a tail of the local circular buffer respectively, and the local circular buffer containing a portion of a data file maintained by a server over a network, generating a second thread to the server over the network to request the first data, if the local circular buffer does not contain the requested first data, and returning the first thread to the client while waiting for a result of the second thread from the server.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 2A-2D are diagrams illustrating an exemplary mechanism for retrieving data according to one embodiment of the inventions.

DETAILED DESCRIPTION

Figure 1:
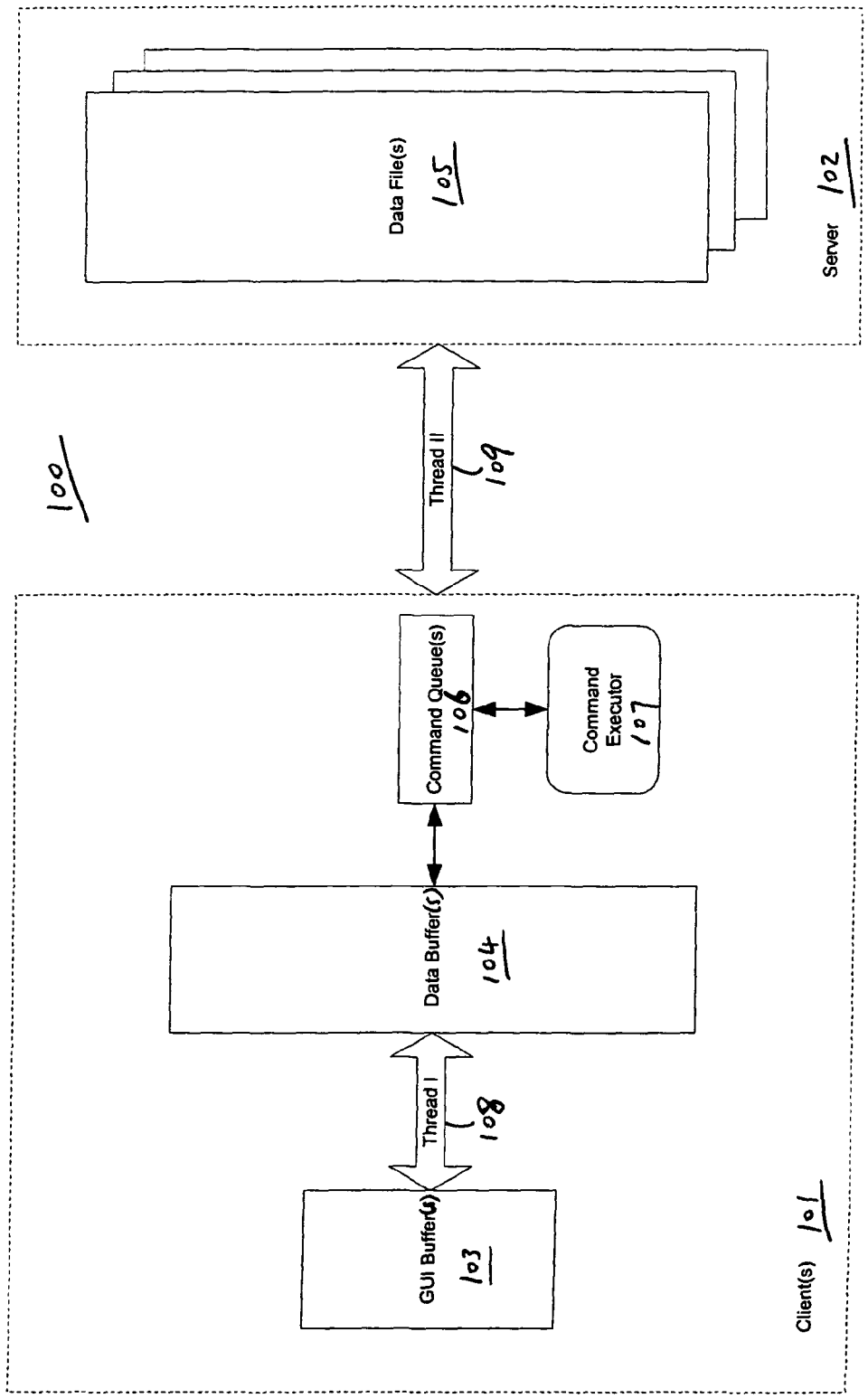
FIG. 1 is a block diagram illustrating an exemplary system according to one embodiment of the invention.

A mechanism for retrieving data over a network using an asynchronous buffer is described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

According to one embodiment, a mechanism for retrieving data using an asynchronous buffer is implemented using a log buffer model. A log buffer model (LBM) is an implementation of a buffer to hold data. In one embodiment, the LBM holds the log records from the logs of a server. A buffer is used to hold log records because a log on the server can contain thousands of records. It is very inefficient to fetch all the data at the client all together. Instead, the buffer tries to look ahead (e.g., anticipate) and calculates if the user might want to view certain data and prefetches a small chunk of data from the logs that may reside on the server over a network.

In one embodiment, the log buffer model is based on a circular buffer that wraps around itself in both directions (e.g., start and end directions). Once the buffer contains the maximum number of records it can hold (e.g., exceeding a buffer size), it starts to write over the oldest data in the buffer. This provides a quick and effective paging mechanism. The overhead to calculate new positions to write into is minimized because the calculations to determine the location for currently retrieved records are minimized. According to one embodiment, the buffer can "grow" in either direction (e.g., growing from the top or bottom of the buffer), dependent upon whether the user is scrolling upwards or downwards.

According to one embodiment, the buffering tries to give an effect of seamless scrolling through the logs. The log records are remotely fetched over the network and therefore are not immediately available. Instead, one or ore fake log records may be returned as one or more placeholders. In addition, an asynchronous and non-blocking request for the requested data may be placed on the server, for example, via a separate thread. When the actual records arrive from the server, the placeholders may be replaced by actual records. In one embodiment, the log buffer model is asynchronous and event based. That is, when it makes requests to fetch data and is in a wait state, the client program is not held up. The client may continue to perform other functionality. The client is notified via events when the requested data arrives. To receive these events, the client may register as listener(s) for listening to the events generated by the log buffer model. Similarly, the log buffer model may register as listener(s) to the server to receive notifications from the server indicating that the requested data is ready to be fetched. As a result, the user does not experience any delay while scrolling since the scrolling is not held up by the fetch process, which may take some time depending on the number of logs being merged and the traffic conditions of the network.

According to one embodiment, a concept of relative indexing is used, which may be manipulated to return the requested data or records to the user. However, it is transparent for the client API (e.g., GUI interface), which may simply request for a record at a certain position. This indexing mechanism is similar to how a swing lookup table works. Therefore, the log buffer model may be used in a variety of GUIs.

According to one embodiment, the buffer is exposed as an API (application programming interface). The client of the API is not exposed to the underlying complexity. This makes the client functionality clean and intuitive, while making the log buffer model more useful. The clients simply request for a record at a certain position based on the table. If the log buffer contains the requested record, the record is returned immediately. Otherwise, a request is placed for the requested record. The request may be carried out through another and independent thread. The main thread was left to be free to accept new requests from the client. When this command is executed, the command consumer informs the registered listener that it has returned with a result set. The listener then updates the GUI with these records and the fake log records returned as placeholders early may be replaced by the received actual records.

FIG. 1 is a block diagram illustrating an exemplary system according to one embodiment of the invention. Referring to FIG. 1, according to one embodiment, exemplary system 100 includes, but is not limited to, one or more clients 101 communicatively coupled to server 102. The client 101 may include, but is not limited to, a GUI 103, a data buffer 104, a command queue 106 and a command executor 107. The server 102 may include one or more data files 105. In one embodiment, the GUI 103 may be a part of a log viewer which may display a portion of log records stored in one or more log files 105 of server 102. The client 101 may be an enterprise client and server 102 may be an enterprise server, such as J2EE or a NET compatible enterprise engine.

The GUI 103 may display a portion of data in the data buffer 104, which may be implemented as a part of a log buffer model (LBM). Since the GUI buffer is typically small comparing to the data stored in the data files 105, only a portion of the data stored in the data files 105 may be displayed in GUI 103. Thus, when a user scroll up or down from the GUI 103, the GUI 103 may periodically fetch data from the server 102. In order to reduce a number of transactions between the client 101 and the server 102 over a network, a buffer 104 may be used to temporarily hold a relatively large portion of data from the data files 105, for example, as shown in FIG. 2.

According to one embodiment, when GUI 103 requests for a record via a first thread 108, processing logic may examine the data buffer 104 to determine whether the requested record is stored within the data buffer 104. If the buffer 104 contains the requested record, the requested record may be fetched from the buffer 104 and returned to the GUI 103 via the first thread 108 substantially immediately.

GUI 103 may be a client with respect to buffer 104. Further, GUI 103 and the data buffer 104 may be implemented on different nodes on the network dependent upon the network configuration. The data buffer 104 may be implemented as a part of log buffer model described above. Furthermore, the data buffer 104 may be implemented as multiple buffers used by the GUI 103. Alternatively, GUI 103 may include multiple clients that share the data buffer 104. Other configurations may exist.

If the requested data is not contained in the buffer 104, according to one embodiment, the processing logic may generate a second thread 109 to the server 102 to retrieve the requested data. The new request may be put in a command queue 106, which may be controlled or monitored by a command executor 107. Once the new request has been put in the command queue 106, the processing logic may return the first thread 108 back to the client 103 while waiting for the result of the new request queued in the command queue 106.

Meanwhile, command executor 107 fetches each of the commands from the command queue 106 and executes each command. In this case, the new request is fetched by the command executor 107 from the command queue 106 and transmitted to the server 102 for the requested data via the second thread 109.

In one embodiment, the first and second threads 108-109 are executed independently and asynchronously. As a result, while the processing logic is waiting for a result of the second thread 109, the first thread 108 is completed and the control is returned back to the client 101. Thus, the client 101 would not be held up by the thread 108 and the client 101 may perform its own functionality, while thread 109 is still pending.

According to one embodiment, the communications between GUI 103, buffer 104, and server 102 may be implemented as event based communication manners. For example, according to one embodiment, GUI 103 may register, as a client, to data buffer 104 as a listener to listen certain events published by the data buffer 104. Similarly, buffer 104 may register as a client to server 102 as a listener to listen certain events. Thus, when buffer 104 makes a new request to the server 102 for data, which may take a while before receiving a result from the server 102 dependent upon the traffic condition of the network, buffer 104 may return or complete the thread 108 back to the client 103 with an indication (e.g., via a fake record) that the request is pending. Therefore, the client 103 would not be held up and can perform its own operations.

When the requested data is returned from the server 102, the data may be stored in the buffer 104. In addition to those requested by GUI 103, according to one embodiment, the returned data from the server 102 may further include additional data based on an anticipation or prediction what data the GUI 103 may want in the future. In one embodiment, since GUI 103 has registered as a listener to buffer 104, buffer 104 may simply call a callback routine provided by GUI 103. GUI 103 may then retrieve the request data from buffer 104. Alternatively, buffer 104 may directly transmit the requested data to a predetermined storage location specified by GUI 103.

According to one embodiment, buffer 104 may be a circular buffer having a head region and a tail region. Depending upon whether a user scrolls up or down, the circular buffer may "grow" in either direction. Once the amount of data stored in buffer 104 exceeds the size of the buffer 104, the buffer may wrap around and the oldest data may be overwritten by the new data received from the server. The head and tail regions of the circular buffer 104 may be maintained using various indexes. Similarly, GUI 103 may also maintain a set of indexes, which may be updated dependent upon the operations of the user (e.g., scrolling up/down of the GUI 103).

Figure 2B:
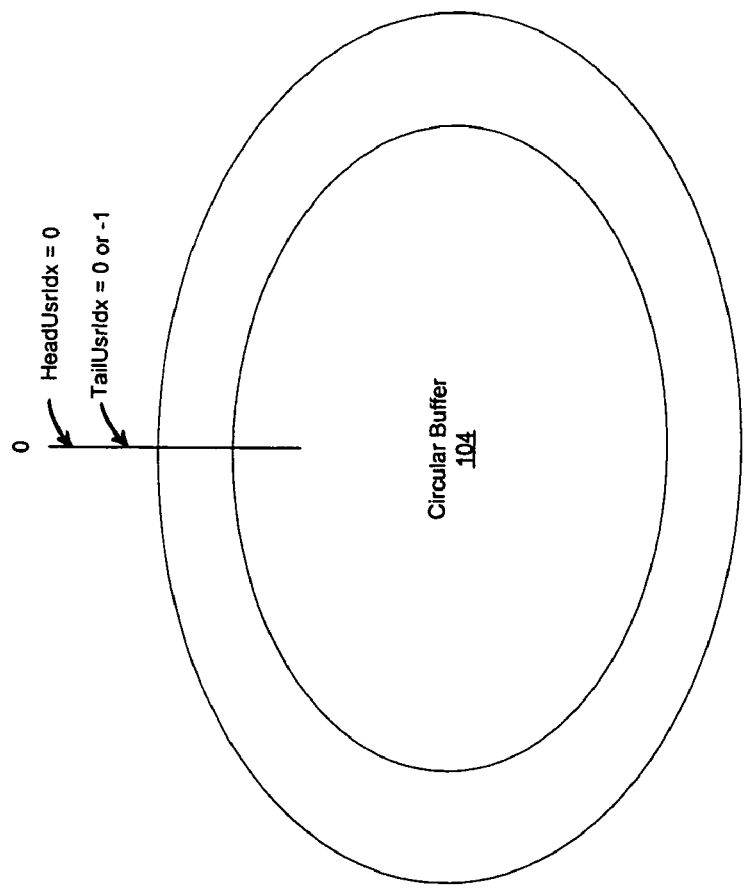
Figure 2B:
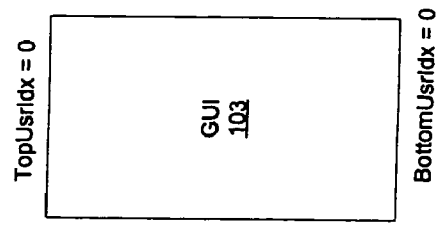
Figure 2C:
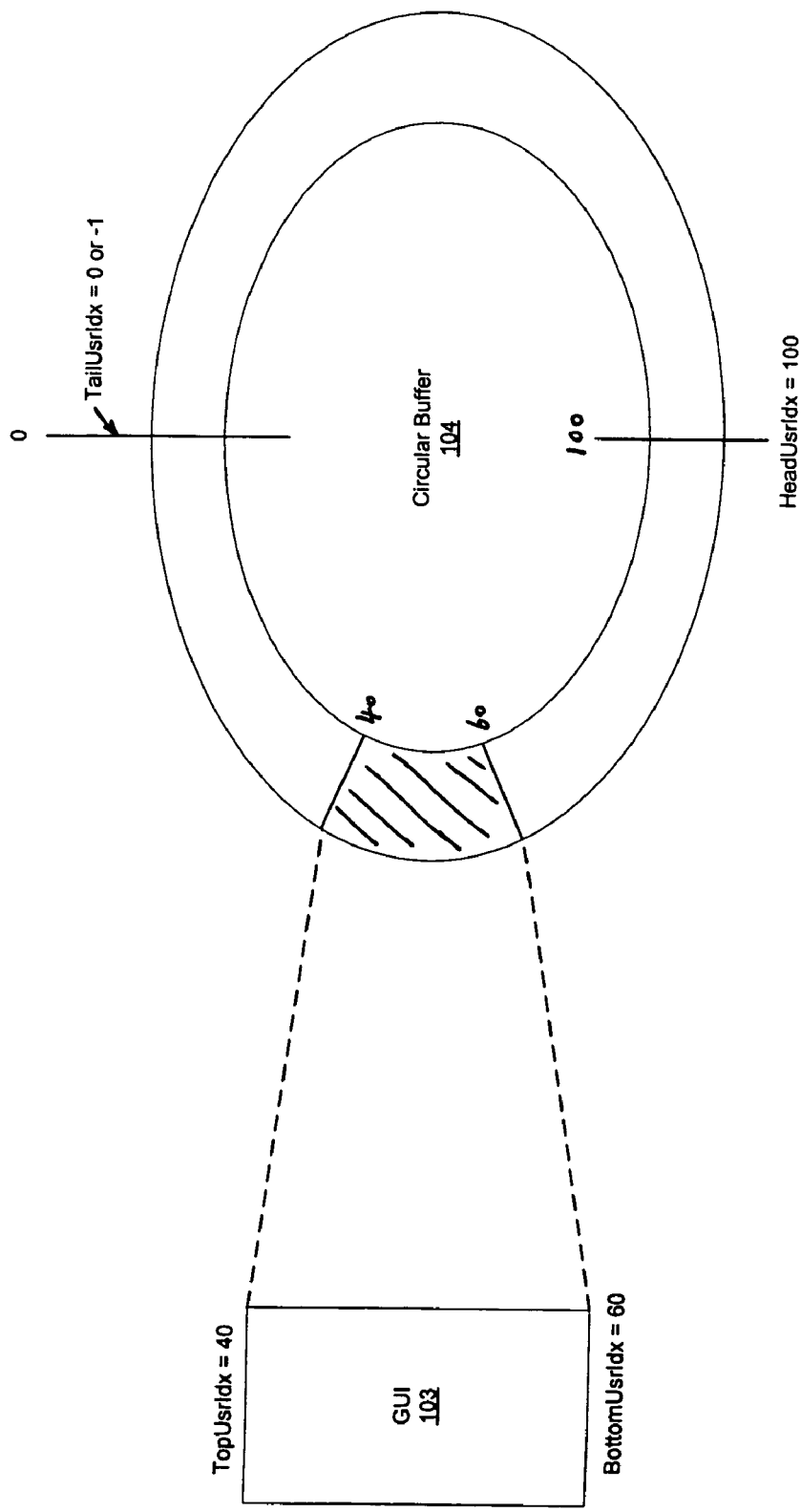

FIGS. 2A-2C are diagrams illustrating an exemplary log buffer model according to one embodiment of the invention. Referring to FIG. 2A, as mentioned above, GUI 103 contains a portion of data stored in buffer 104, which store a portion of data stored in data file 105 of a server. According to one embodiment, buffer 104 is a circular buffer having a head region and a tail region that may be identified by a head user index ("HeadUsrIdx") and a tail user index ("TailUsrIdx"). In addition, GUI 103 also maintains a top user index ("TopUsrIndex") and a bottom user index ("BottomUsrIdx") to identify where the data currently displayed in the GUI is located in buffer 104.

Initially, when the buffer is empty as shown FIG. 2B, the TopUsrIdx and the BottomUsrIdx of GUI 103 are all zero, as well as the HeadUsrIdx and TailUsrIdx of buffer 104, which indicates that there is no data in the circular buffer and no data is displayed in GUI 103.

As the data is filled in the circular buffer 104, for example, up to half of the circular buffer is filled as shown as the shadow area in FIG. 2C, the TopUsrIdx/BottomUsrIdx of GUI 103 and HeadUsrIdx/TailUsrIdx of circular buffer 104 are updated accordingly. For example, for the purposes of illustrations, it is assumed that the circular buffer 104 has a size of 200 while the GUI 103 has a size of 20. In this example, the HeadUsrIdx and TailUsrIdx of circular buffer 104 are 100 and 0 respectively. Further, it is assumed that GUI 103 is displaying records from 40-60 of the circular buffer. As a result, the TopUsrIdx and BottomUsrIdx of GUI 103 are 40 and 60 respectively. Note that the sizes set forth above are for illustration purposes only. It will be appreciated that other sizes or configurations may also be applied.

As more data is filled, the HeadUsrIdx of circular buffer 104 keeps moving up, for example, from 100 to 200, until the buffer is full. In which case, the HeadUsrIdx of buffer 104 reaches 200 which points to the origin (e.g., zero). If more data is filled after the circular buffer 104 is full, a portion of the circular buffer will be overwritten. For example, if there 10 more records are filled, the HeadUsrIdx will be 210 while the TailUsrIdx will be 10. In which case a portion (e.g., original records from 0 to 10) will be overwritten (e.g., lost), similar to the situation shown in FIGS. 5A and 5B.

Figure 2D:
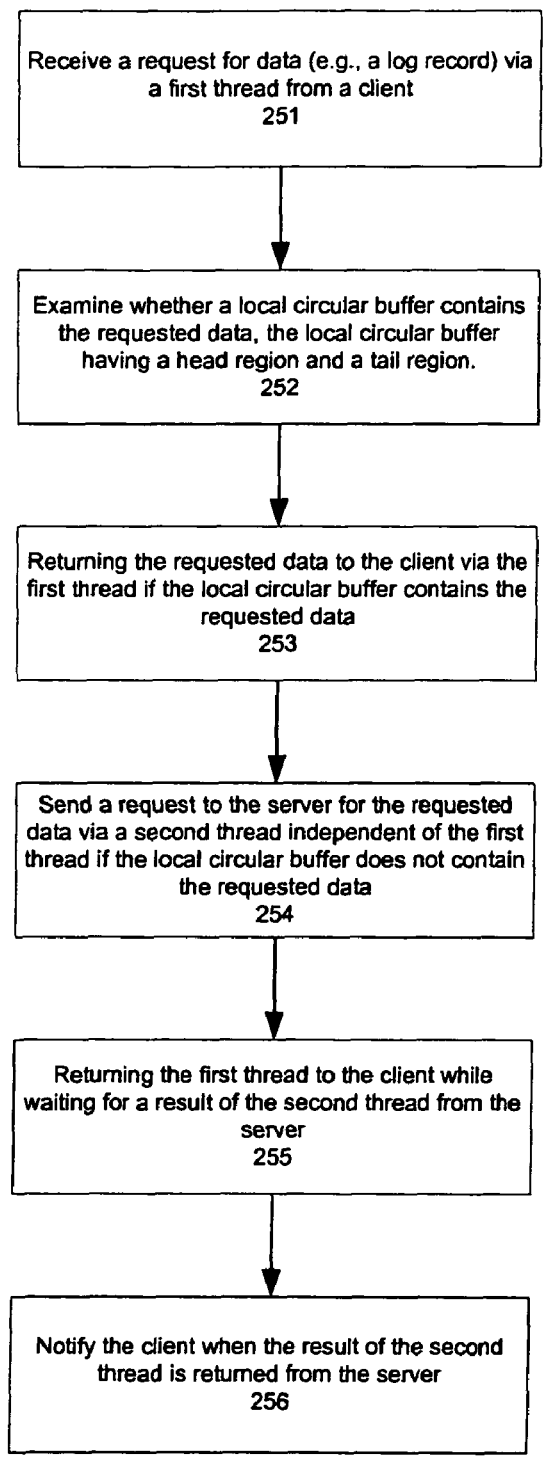

FIG. 2D is a flow diagram illustrating an exemplary process for retrieving data using an asynchronous circular buffer, according to one embodiment of the invention. Exemplary process 250 may be performed by a processing logic that may include hardware (circuitry, dedicated logic, etc.), software (such as is run on a dedicated machine), or a combination of both. In one embodiment, the exemplary process includes, but is not limited to, in response to a request for first data from a client via a first thread, determining whether a local circular buffer contains the requested first data, the local circular buffer having a head region and a tail region for identifying a head and a tail of the local circular buffer respectively, and the local circular buffer containing a portion of a data file maintained by a server over a network, generating a second thread to the server over the network to request the first data, if the local circular buffer does not contain the requested first data, and returning the first thread to the client while waiting for a result of the second thread from the server.

Referring to FIG. 2D, at block 251, a request for data is received from a client (e.g., client 101 of FIG. 1) via a first thread. In one embodiment, the request is identified via a request index. In response to the request, at block 252, the processing logic examines whether a local circular buffer (e.g., buffer 104 of FIG. 1) contains the requested data, where the local circular buffer includes a head region and a tail region, which may be identified by, for example, a head index and a tail index. In one embodiment, the request index may be compared with the head index and/or tail index. If the local circular buffer contains the requested data, at block 253, the requested data is returned substantially immediately via the first thread.

If the local circular buffer does not contain the requested data, at block 254, a new request is sent to the server (e.g., server 102 of FIG. 1) over a network via a second thread. The second thread may be launched independently and asynchronously with respect to the first thread. At block 255, the first thread is returned while waiting for a result of the second thread, such that the client would not be held up by the first thread. Once the result of the second thread is returned from the server, at block 256, the client may be notified and the requested data may be retrieved or alternatively, the requested data may be transmitted to the client directly. Other operations may also be performed.

Figure 3A:
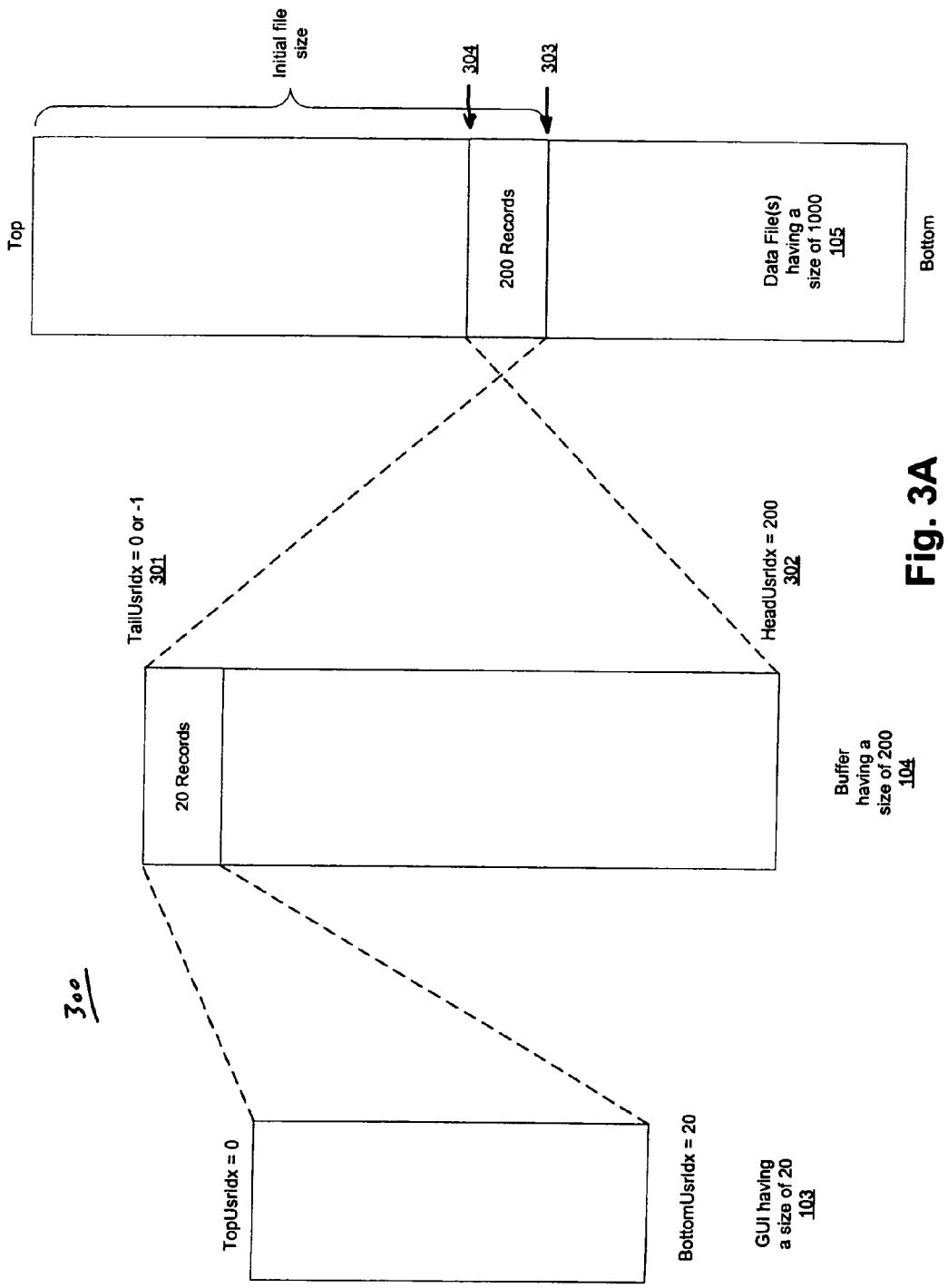
FIGS. 3A and 3B are diagrams illustrating an exemplary mechanism for retrieving data according to another embodiment of the inventions.
Figure 3B:
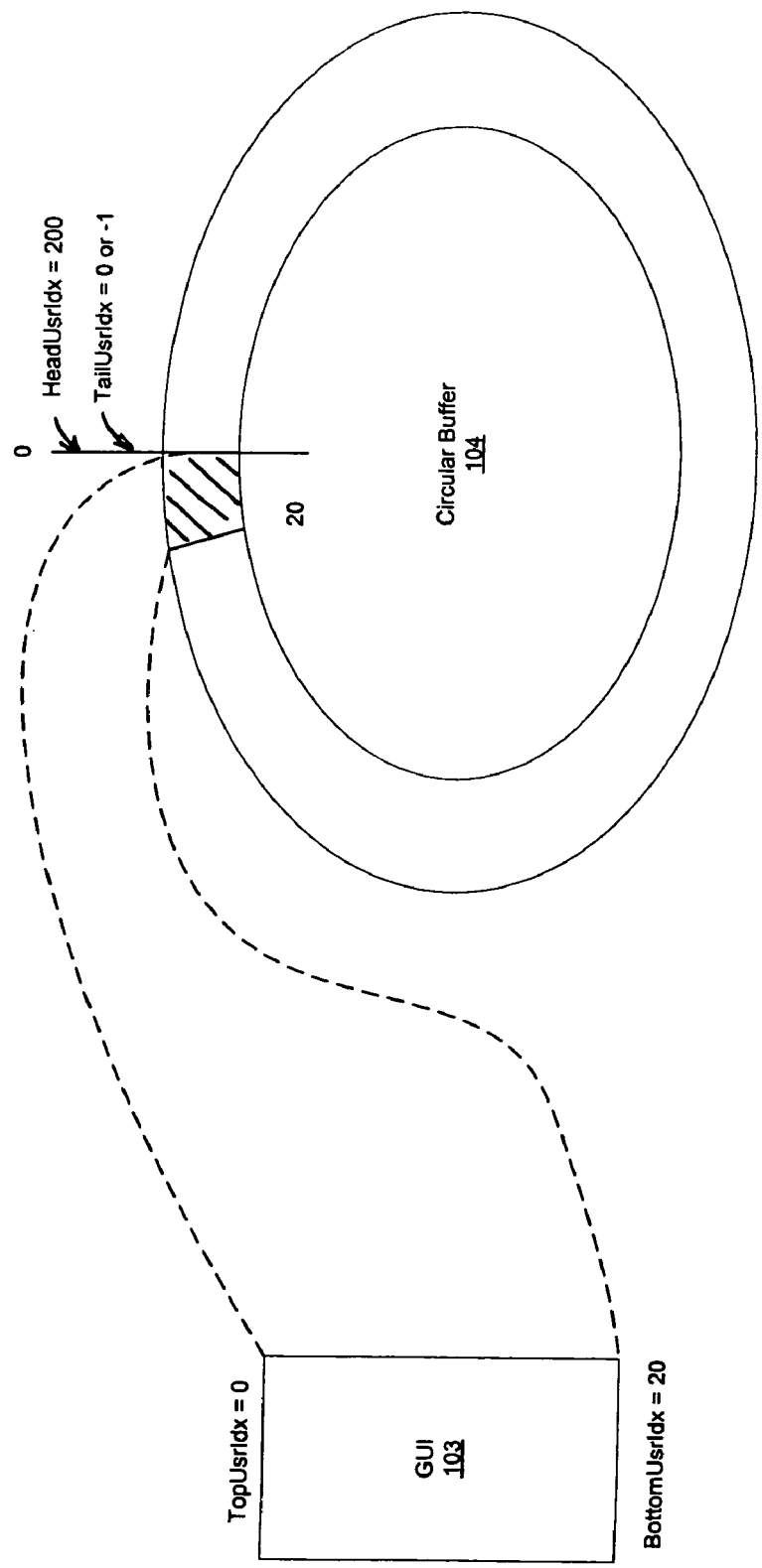

FIGS. 3A and 3B are block diagrams illustrating an exemplary log buffer model according to another embodiment of the invention. Referring to FIG. 3A, similar to an embodiment as shown in FIGS. 2A-2C, it is assumed that the GUI 103 has a size of 20 while buffer 104 has a size of 200, and the data file 105 has a size larger than the buffer size, such as, for example, 1000, etc. Typically, the data is filled in the data file 105 chronologically from top to bottom. However, according to one embodiment, the data filled in the circular buffer is in a reversed order because typically, a user wishes to view the requested data first. For example, initially, the newest data will be placed on the top of the buffer 104 while the oldest data will be placed at the bottom of the buffer 104. In this embodiment, the HeadUsrIdx of the buffer 104 is pointing to a location 302 of the oldest record while the TailUsrIdx of the buffer 104 is pointing to a location 301 of the newest record. However, it is not so limited. Dependent upon a specific configuration, the data stored in buffer 104 may be stored chronologically and other configurations may exist.

In this example, as shown in FIGS. 3A and 3B, the buffer 104 is full. As a result, the HeadUsrIdx is 200 while he TailUsrIdx is 0. Since the buffer size of the circular buffer 104 is 200, in fact, both HeadUsrIdx and TailUsrIdx are pointing to the same location as shown in FIG. 3B. Also, in this example, the GUI 103 is displaying the first 20 records (e.g., the newest 20 records) of the circular buffer 104. Thus, the TopUsrIdx is 0 while the BottomUsrIdx is 20. Dependent upon how the data is being read from the data file 105, the file pointer may be pointing to either location 303 or 304, which represents the boundary of the data corresponding to the data stored in the buffer 104.

In one embodiment, GUI 103 sends a request for a record from buffer on a record by record basis. In a particular embodiment, GUI 103 specifies a record by providing a request index ("ReqIdx") to the buffer 104. For example, if GUI 103 wishes to retrieve record 15, GUI 103 may pass ReqIdx having a value of 15 as a parameter when requests for a record from buffer 104. The request may be carried out via a thread, such as first thread 108 of FIG. 1.

In response to the request received from GUI 103, the buffer 104 determines whether the buffer 104 contains the requested record based on the ReqIdx received from GUI 103. In one embodiment, buffer 104 determines whether the ReqIdx is within either a head region or a tail region of the buffer. For example, buffer 104 may compare the ReqIdx with the HeadUsrIdx and the TailUsrIdx. In this case, since the ReqIdx is 15 and ReqIdx is less than the HeadUsrIdx (e.g., within the head region), it is considered that the buffer 104 contains the requested record identified by the ReqIdx. As a result, the requested record is returned immediately without having to access the data file 105 stored in the server over the network. That is, the log buffer model may simply return the requested record via the same thread without having to launch another thread to request data from the server.

A user of GUI 103 may view the 20 records displayed within GUI 103. The user may also scroll up and down on a line by line (e.g., record by record) basis. Alternatively, the user may scroll page up and down (e.g., every 20 record step). Further, the user may reset to top or bottom of the buffer 104 (e.g., records 0-20 or records 180-200). In response to the user actions set forth above, TopUsrIdx/BottomUsrIdx and HeadUsrIdx/TailUsrIdx may be adjusted accordingly.

Dependent upon the specific implementations, the TailUsrIdx may be maintained as 0 or −1 to identify whether there is valid data within the tail region. For example, according to one embodiment, if the circular buffer "grows" in a positive direction, such as scrolling down of the GUI by a user, the HeadUsrIdx may be increased while the TailUsrIdx remains the same as −1, where a value of −1 indicates that there is no valid data between the origin 0 and −1, as described as the tail region. The actual tail of the circular buffer may be derived from the adjusted HeadUsrIdx and the buffer size (e.g., 200 as an example shown in FIGS. 3A and 3B) as:

Actual Tail Position=HeadUsrIdx−Buffer Size

Alternatively, according to an alternative embodiment, the TailUsrIdx may be maintained as 0 initially. When the HeadUsrIdx is adjusted due to the user actions (e.g., scrolling up/down), the TailUsrIdx is also adjusted accordingly. As a result, the head and tail regions of the circular buffer is determined based on both the HeadUsrIdx and the TailUsrIdx, as shown, for example, in FIGS. 4A and 4B according to one embodiment.

Figure 4A:
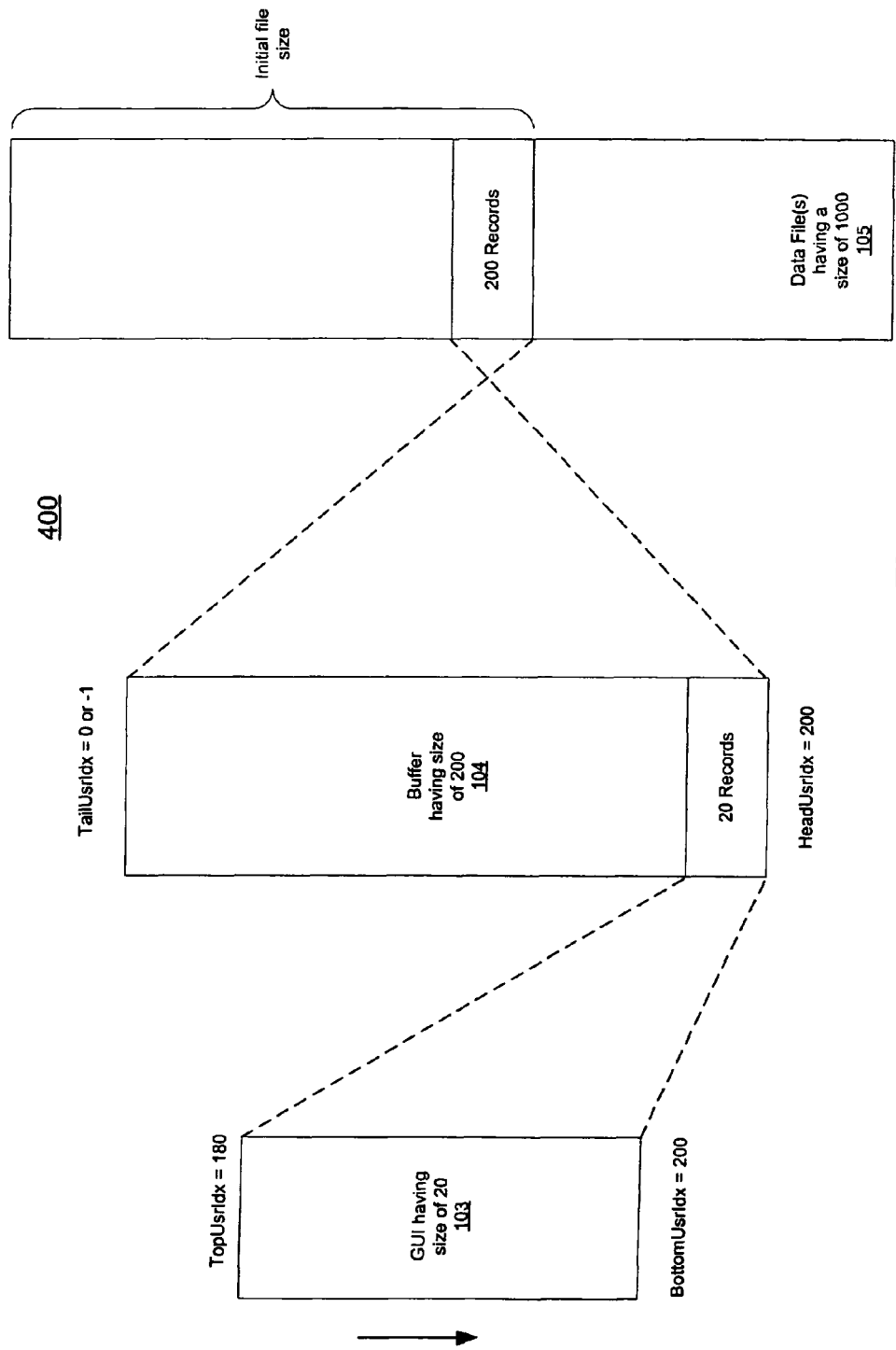
FIGS. 4A and 4B are diagrams illustrating an exemplary mechanism for retrieving data according to another embodiment of the inventions.
Figure 4B:
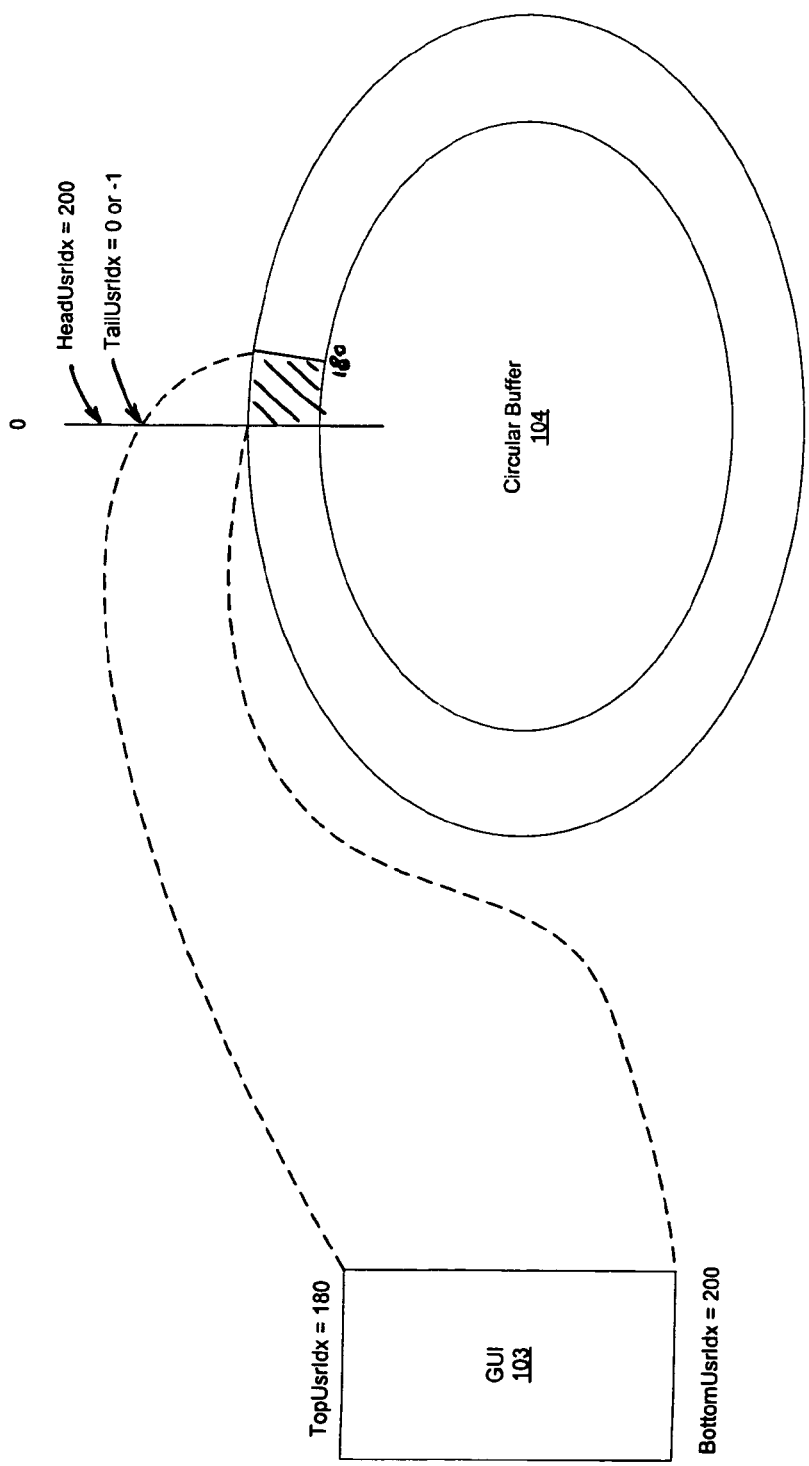

Referring to FIGS. 4A and 4B, in this embodiment, a user keeps scrolling down on GUI 103 to the bottom of the buffer 104 (e.g., the oldest records in the buffer 104). In this case, the TopUsrIdx and the BottomUsrIdx of GUI 103 are adjusted respectively as 180 and 200. Since the TopUsrIdx and the BottomUsrIdx are still within the head region or tail region of the circular buffer 104, the HeadUsrIdx and the TailUsrIdx remain unchanged as 200 and 0/−1.

Figure 5A:
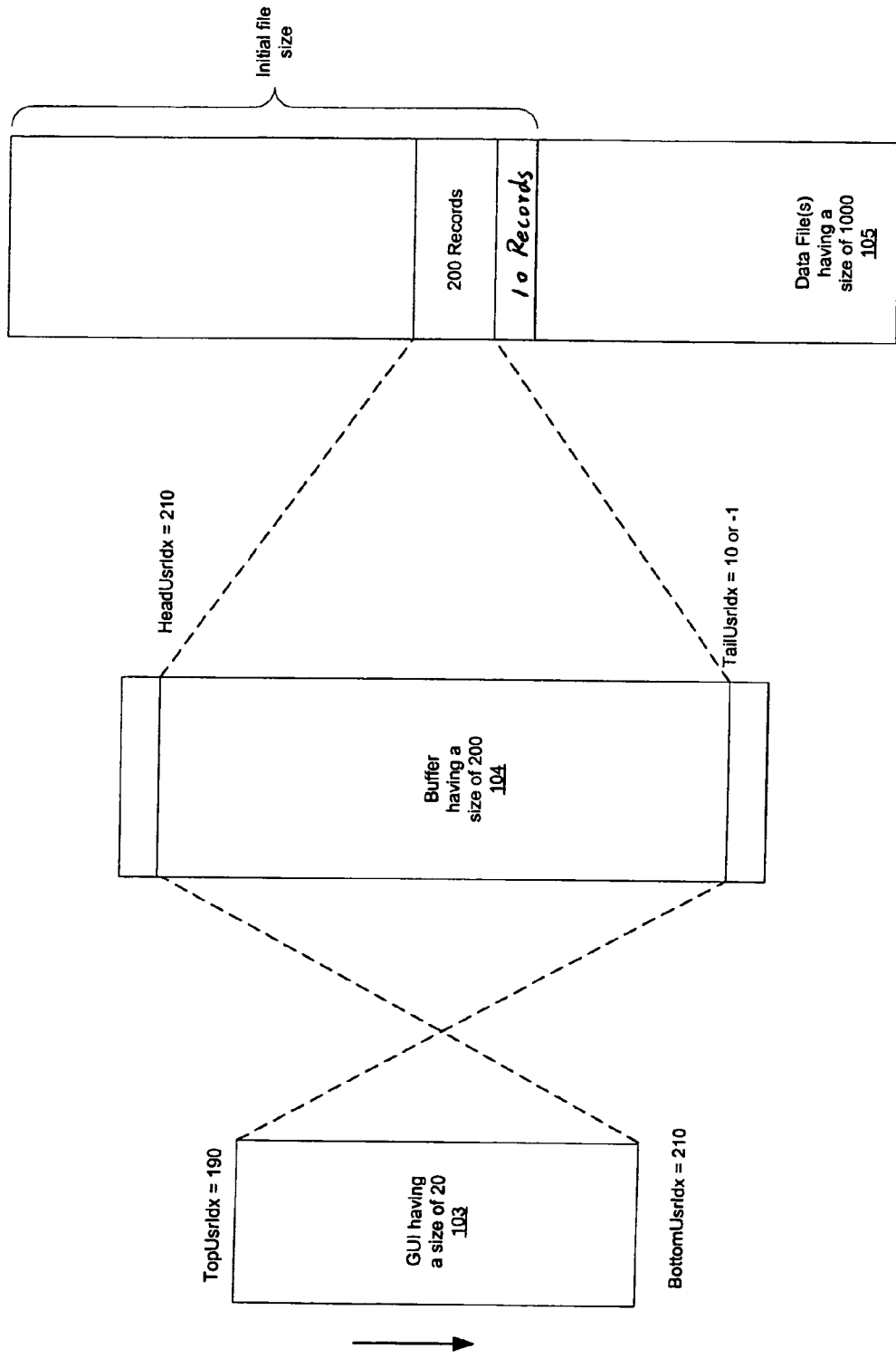
FIGS. 5A and 5B are diagrams illustrating an exemplary mechanism for retrieving data according to another embodiment of the inventions.
Figure 5B:
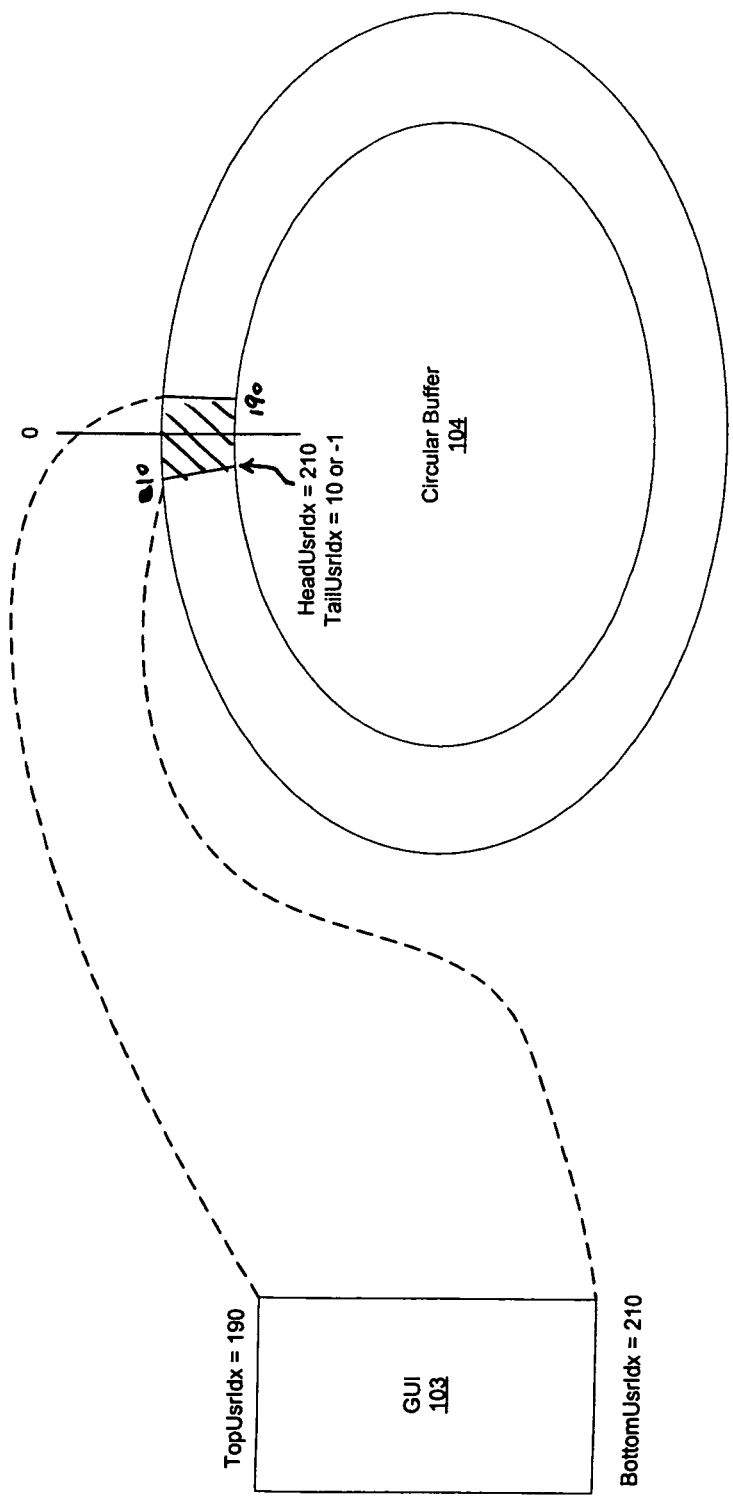

As a user keeps scrolling down, the circular buffer 104 may not contain the requested data or records, for example, as shown in FIGS. 5A and 5B according to one embodiment. Referring to FIGS. 5A and 5B, for example, it is assumed that the user keeps scrolling down and exceed the original bottom of GUI 103 by 10 records. In this example, GUI 103 is displaying records associated with indexes from 190 to 210.

As a result, the TopUsrIdx and the BottomUsrIdx may be adjusted as 190 and 210. The GUI 103 may have to request new records from buffer 104 by asking for records associated with indexes from 201 to 210. The request may be issued record by record, or alternatively, by a chunk of record (e.g., a page of GUI 103).

When buffer 104 receives such requests, buffer 104 may examine whether the buffer 104 contains the requested records based on the ReqIdx provided by the request. In one embodiment, the ReqIdx is compared with the HeadUsrIdx and/or the TailUsrIdx to determine whether the requested record(s) is within the head region and/or tail region of buffer 104.

For example, when the GUI 103 requests for a record associated with a request index as 201 (e.g., ReqIdx=201, also referred to as record 201), the buffer 104 compares the ReqIdx with the HeadUsrIdx and/or the TailUsrIdx. At this point, the HeadUsrIdx is 200 and the TailUsrIdx is 0/−1 dependent upon a specific implementation. In this example, the ReqIdx is clearly beyond the head region (e.g., ReqIdx>HeadUsrIdx) of buffer 104. Thus, buffer 104 does not contain the requested record 201. As a result, buffer 104 has to request the requested record from the data file 105, which may be stored in a server over a network as shown in FIG. 1.

According to one embodiment, if buffer 104 determines that the requested record is not in the buffer, an application software module associated with the buffer 104 (simply referred to as herein buffer 104) may generate a second thread to a server associated with the data file 105 (e.g., server 102 of FIG. 1) for the requested record (e.g., record 201), independent and separated (e.g., asynchronously) from a first thread received from GUI 103. Dependent upon the traffic condition of the network, since the result of the second thread may take a while, the buffer 104 may return or terminate the first thread immediately by returning to the client a status or a fake record indicating the requested record is pending. As a result, the GUI 103 is not held up by a request sent to the server.

In addition, before launching the second thread, buffer 104 may further examine whether the requested record has been previously requested from the server (e.g., via another thread) and a result of the previous request is still pending. If the result of the previous request is still pending, buffer 104 may simply return the first thread substantially immediately without launching the second thread. Once the result of the previous request arrives from the server, buffer 104 may notify GUI 103 or simply transmit the requested record to GUI 103. Thereafter, the HeadUsrIdx and TailUsrIdx are adjusted accordingly. The HeadUsrIdx may be adjusted from 200 to 210, while the TailUsrIdx may be adjusted from 0 to 10 or alternatively, remain the same as −1, dependent upon the specific implementation.

In a particular embodiment, in order to keep track a previous request, a previous request start index ("RequestedStartIdx") and a previous request end index ("RequestedEndIdx") are maintained to store the starting and ending position of the previously requested record(s). According to one embodiment, when it is determined that the ReqIdx is beyond the head region, the ReqIdx may be compared with RequestedStartIdx and RequestedEndIdx to determine whether a previous request that covers the requested record has been made and is still pending. The second thread is launched only if the previous request on the same region has not been made.

Similarly, once the second thread has been launched and is still pending, the RequestedStartIdx and RequestedEndIdx are updated to reflect the pending request to the server to determine whether a subsequent request to the server is needed.

According to a further embodiment, a request sent to the server via the second thread may include additional data or records other than the requested record. The additional records may be requested based on an anticipation of the user's future action. For example, referring to FIGS. 5A and 5B, when the user requests record 201, it is anticipated that the user may keep scrolling down further in a near future. For example, the request from buffer 104 to data file 105 may include additional records (e.g., 20 or 40 additional records). As a result, subsequent requests between buffer 104 and data file 105 may be avoided if the subsequent requests from the user are within the requested range and the network traffic between buffer 104 and the server may be reduced.

Similarly, a user of GUI 103 may scroll the other direction of the GUI 103 (e.g., scrolling up). The scrolling up action may be performed from the configuration of FIGS. 3A and 3B or configuration of FIGS. 5A and 5B. In the examples discussed throughout above, it is assumed that the newest records are placed on the tail region identified by the tail user index TailUsrIdx. When the user of GUI 103 keeps scrolling up to the top of the GUI 103, as shown in FIGS. 3A and 3B, further scroll-up operations may cause buffer 104 to request additional records from the server since buffer 104 does not contain such records, for example, as shown in FIGS. 3A and 3B.

For example, referring back to FIGS. 3A and 3B, in this example, the GUI 103 is displaying the newest 20 records maintained by buffer 104, which is identified by the TailUsrIdx. If the user keeps scrolling up, for example, by 10 more records, buffer 104 may not contain such scrolled-up 10 more records. As a result, buffer 104 may have to make a new request (via another thread) to server for such new records. Dependent upon whether the data file 105 contains any new records since the original requests made by buffer 104. If there is no new records stored in the data file 105 since the last request on the same region, the server return a status for such indication.

Figure 6A:
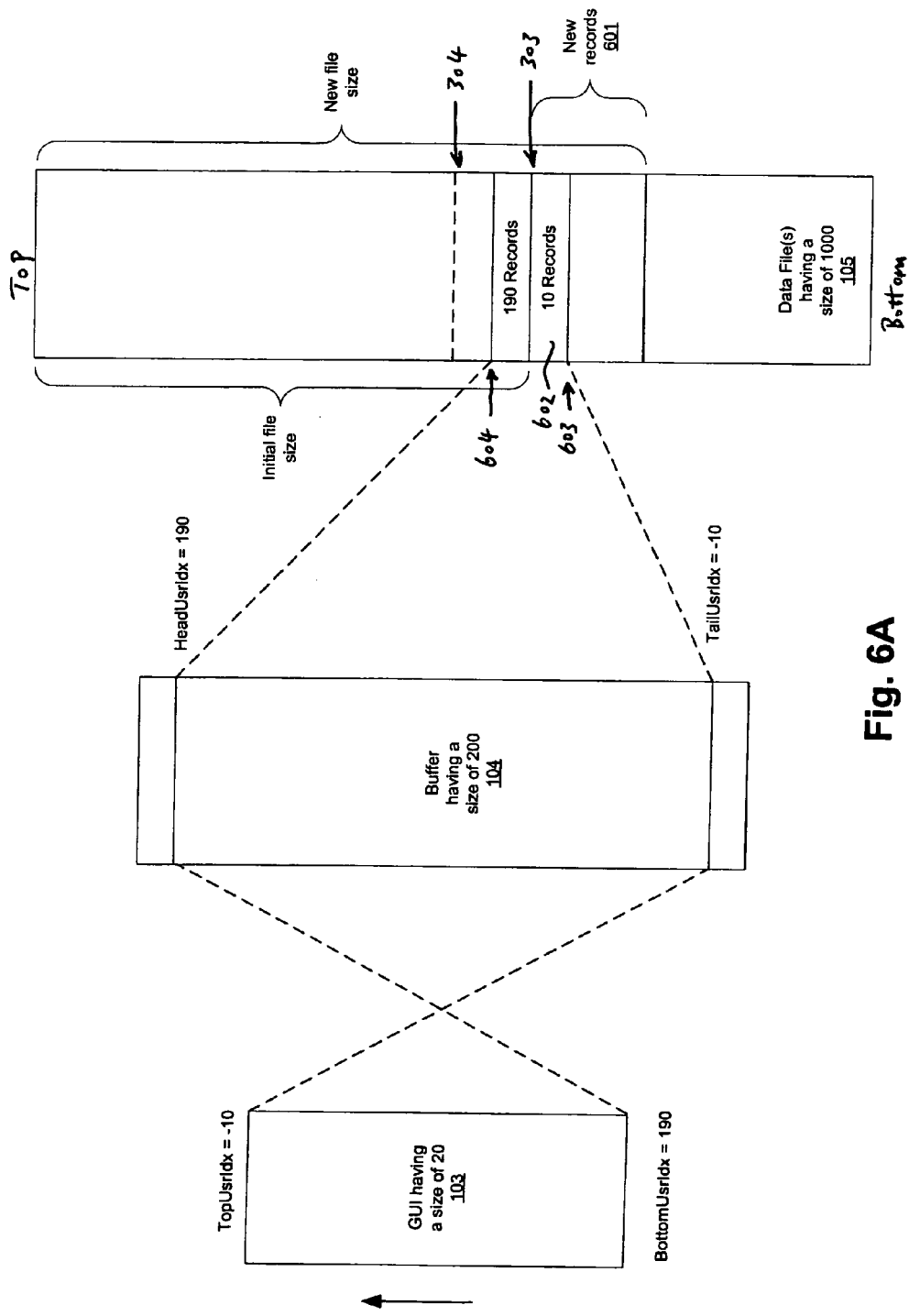
FIGS. 6A and 6B are diagrams illustrating an exemplary mechanism for retrieving data according to another embodiment of the inventions.
Figure 6B:
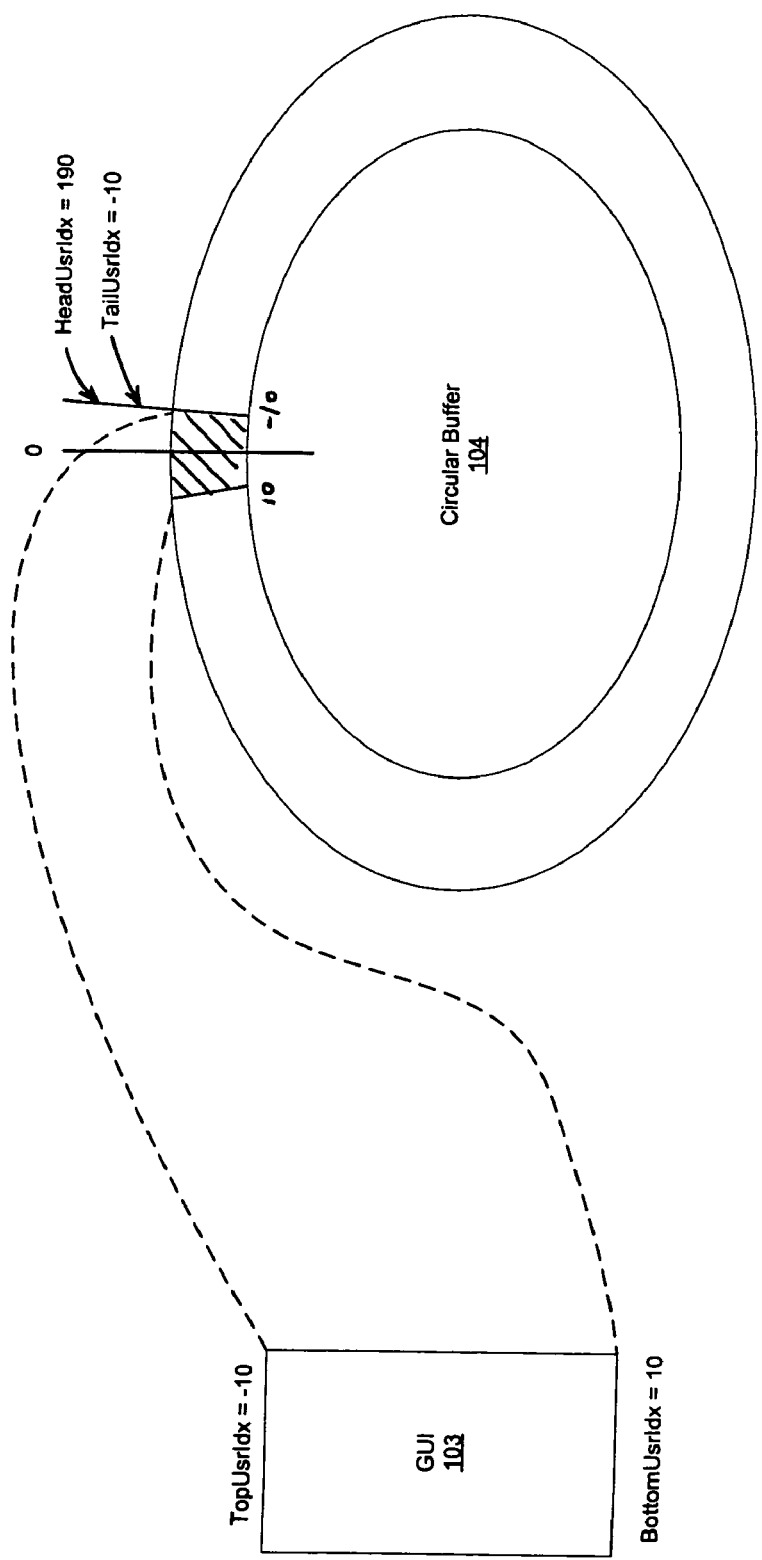

If the data file contains more newer records since the original request, as shown in FIGS. 6A and 6B, buffer 104 may retrieve those newer records from the server and the GUI may display the newer records in response to the user's scroll-up action, for example, from the configuration as shown in FIGS. 3A and 3B.

Referring FIGS. 3A-3B and 6A-6B, for the illustration purposes, it is assumed that after the initial fetch from the buffer 104, new records 601 has been stored in the data file 105. Meanwhile, the user of GUI 103 keep scrolling up from the configuration of FIGS. 3A and 3B, for example, by 10 more records up. As a result, the TopUsrIdx and BottomUsrIdx are updated as −10 and 10 respectively as shown in FIGS. 6A and 6B. In response, buffer 104 has to make a new request (via another thread) to data file 105 from the new records 601. The new request may request for only the 10 new records 602. Alternatively, additional records may be requested based on the anticipation or prediction of the user's actions.

After the new request has been received, the HeadUsrIdx and the TailUsrIdx may be updated as 190 and −10, which point to positions 604 and 603 of data file 105 respectively, while the previous HeadUsrIdx and the previous TailUsrIdx were pointing to positions 304 and 303 respectively. Alternatively, according to another embodiment, when the user scrolls up the GUI 103, only the TailUsrIdx is updated as −10 while the HeadUsrIdx remains unchanged as 200, dependent upon the specific implementation. The actual head of the circular buffer 104 may be derived from the TailUsrIdx and the size of the circular buffer as follows:

Actual Head=TailUsrIdx+Buffer Size

According to a further embodiment, a file pointer of the data file 105 may be adjusted before making a new request for the new records to avoid acquiring duplicated data or records, particularly when the user of GUI 103 changes the scrolling directions. According to one embodiment, if the current request is in the tail region and if the previous request was in the head region, the file pointer may be adjusted to the position corresponding to the current TailUsrIdx. Likewise, according to another embodiment, if the current request is in the head region and the previous request was in the tail region, the file pointer may be adjusted to a position corresponding to the current HeadUsrIdx.

For example, referring back to FIGS. 3A and 3B, after the initial fetch from the buffer 104, the file pointer of the data file 105 may be positioned at position 304. If the user of GUI 103 scrolls all the way down and may exceed the BottomUsrIdx, the next fetch from the buffer 104 to the data file will be from position 304 and up towards to the top of the data file. As a result, the file pointer which currently pointing at position 304 (corresponding to the HeadUsrIdx) does not have to be adjusted.

However, if the user keeps scrolling up instead exceeding the TopUsrIdx, for example, by 10 records, referring to FIGS. 6A and 6B, at least additional 10 new records 602 starting from position 303 (e.g., the original TailUsrIdx or the original end of file indication) have to be fetched. Since the buffer 104 already contains 190 records from positions 604 to 303, there is no need to refetch these records again. Therefore, according to one embodiment, the file pointer initially pointing to position 304 may be adjusted to the position 303 corresponding to the current TailUsrIdx. Thereafter, a new request including the 10 records 602 may be fetched based on the adjusted file pointer pointing to position 303. Similar operations may be performed if the current transaction is in the head region and the previous request was in the tail region.

Figure 7:
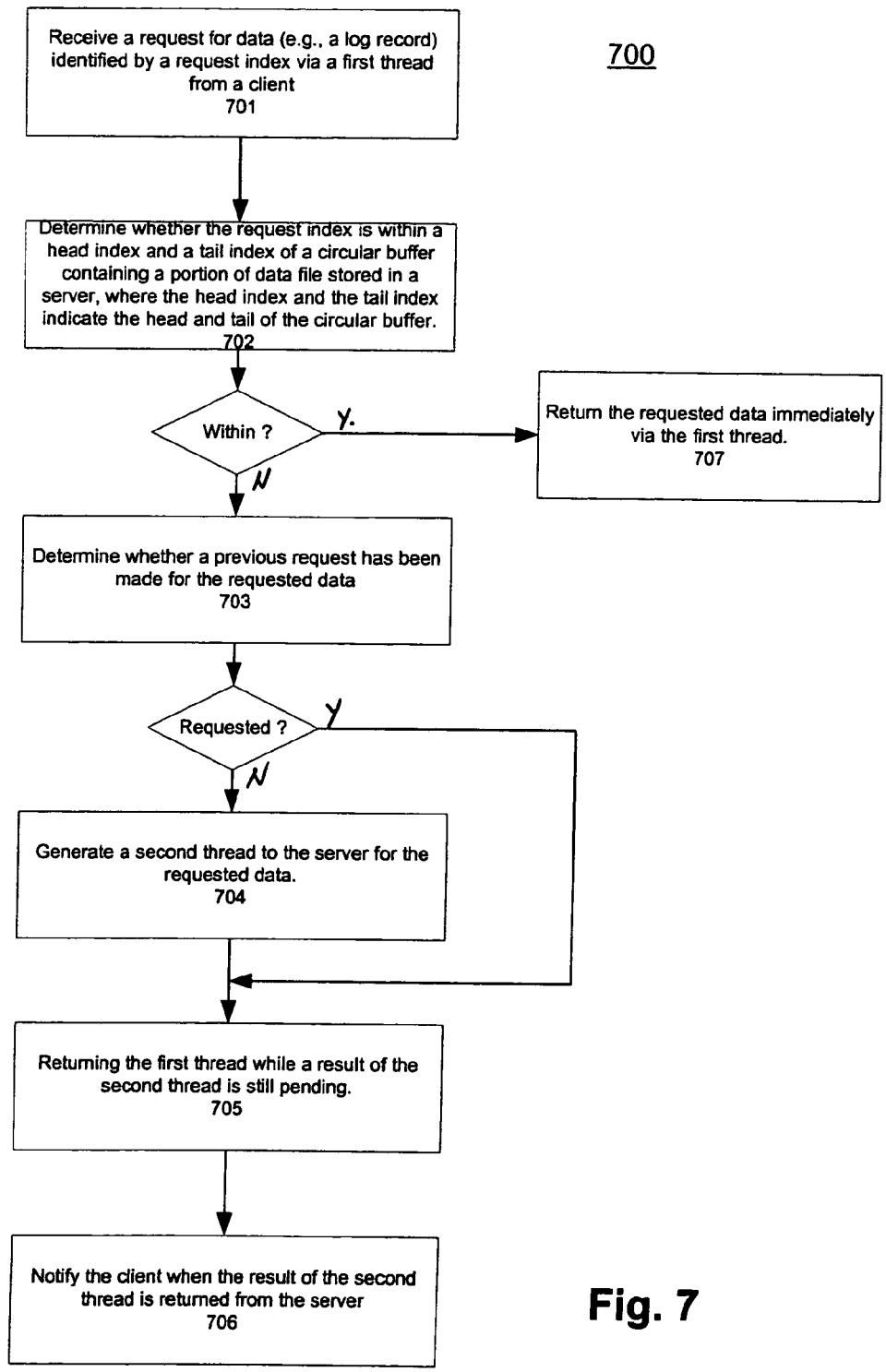
FIG. 7 is a flow diagram illustrating an exemplary process for retrieving data according to another embodiment of the invention.

FIG. 7 is a flow diagram illustrating an exemplary process for retrieving data according to another embodiment of the invention. Exemplary process 700 may be performed by a processing logic that may include hardware (circuitry, dedicated logic, etc.), software (such as is run on a dedicated machine), or a combination of both. Referring to FIG. 7, at block 701, a request for data (e.g., a log record) identified by a request index is received from a client via a first thread. In response to the request, at block 702, the processing logic determines whether the request index is within a head index and/or a tail index of a local circular buffer. The local circular buffer contains a portion of a data file (e.g., a log file) stored in a server over a network, where the head index and the tail index indicate the head and tail regions of the local circular buffer. If the request index is within the head index and/or tail index, at block 707, the requested data is retrieved from the local circular buffer and returned to the client immediately.

Otherwise, if the request index is not within the head index and/or tail index, at block 703, the processing logic determines whether a previous request has been made to the server that covers the requested data. In one embodiment, a requested start index (e.g., RequestedStartIdx) and/or a requested end index (e.g., RequestedEndIdx) may be maintained when the previous request is made. The determination may be performed by comparing the request index with the requested start index and/or requested end index. If the previous request has not been made, at block 704, a second thread may be launched to the server for the requested data. Otherwise, at block 705, the first thread is returned to the client, while waiting for a result of the second thread or a result of the previous request of another thread. Once the result is received, at block 706, the client is notified or alternatively, the requested data is sent to the client directly. Other operations may also be performed.

Figure 8:
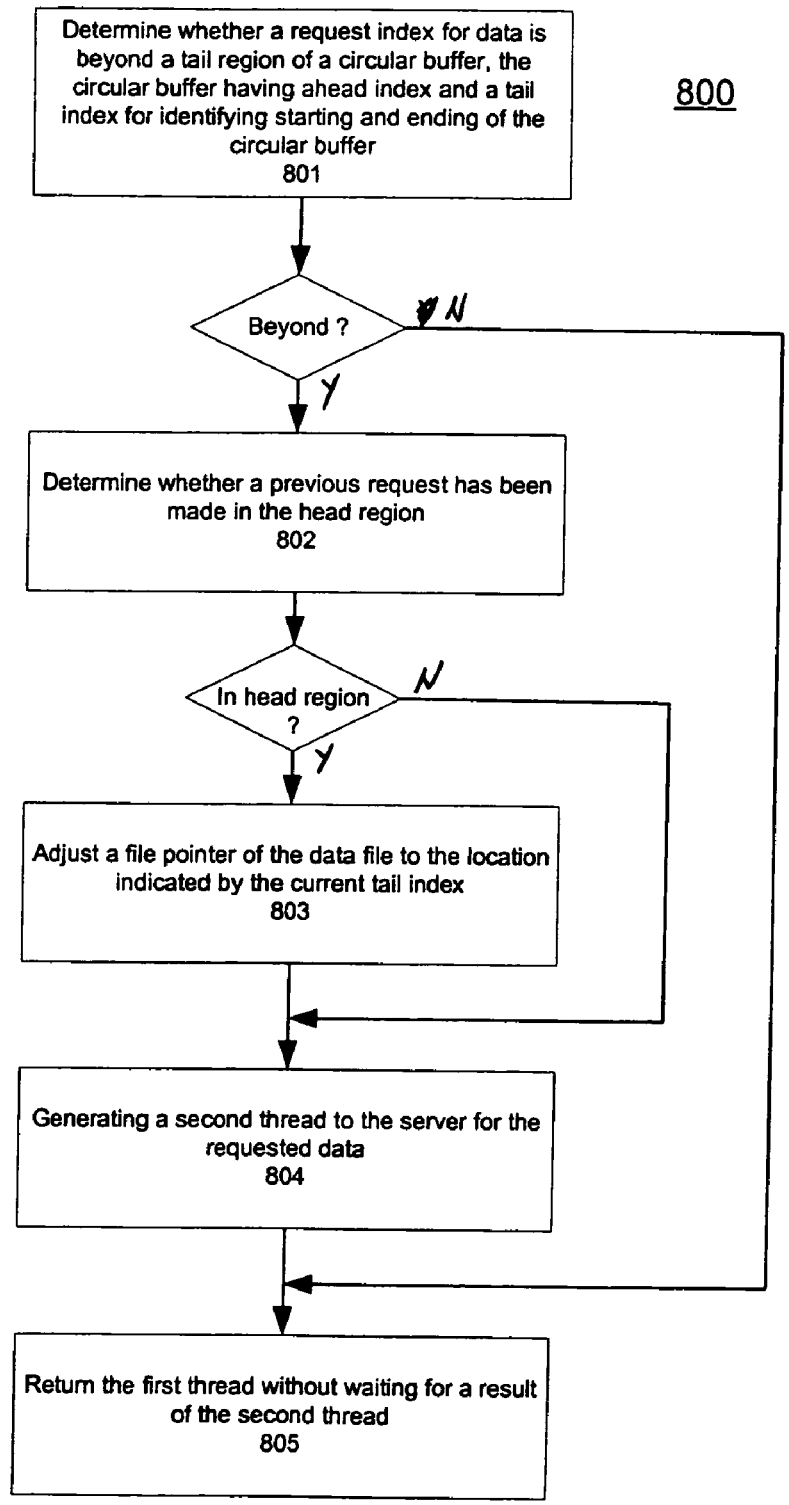
FIG. 8 is a flow diagram illustrating an exemplary process for retrieving data according to another embodiment of the invention.

FIG. 8 is a flow diagram illustrating an exemplary process for retrieving data according to another embodiment of the invention. Exemplary process 800 may be performed by a processing logic that may include hardware (circuitry, dedicated logic, etc.), software (such as is run on a dedicated machine), or a combination of both. For example, according to one embodiment, exemplary process 800 may be performed as a part of process block 703 of FIG. 7.

Referring to FIG. 8, when a request for a record is received from a client, at block 801, the processing logic determines whether a request index associated with the request is beyond a tail region of a circular buffer, where the circular buffer includes a head index and a tail index for identifying the head and tail regions. If the request index is beyond the tail region of the circular buffer, at block 802, the processing logic determines whether a previous request has been made in the head region. In one embodiment, the request index is compared with a requested start index and a requested end index representing the starting and ending positions of the previous request to determine whether the previous request was made in the head region, which are maintained when the previous request was made. If the previous request was made in the head region, at block 803, a file pointer of the data file stored in the server may be adjusted to a position corresponding to the current tail index of the circular buffer. At block 804, a second thread is generated to acquire the requested records. Thereafter, at block 805, the first thread is returned while the second thread is pending. Other operations may also be performed.

Figure 9:
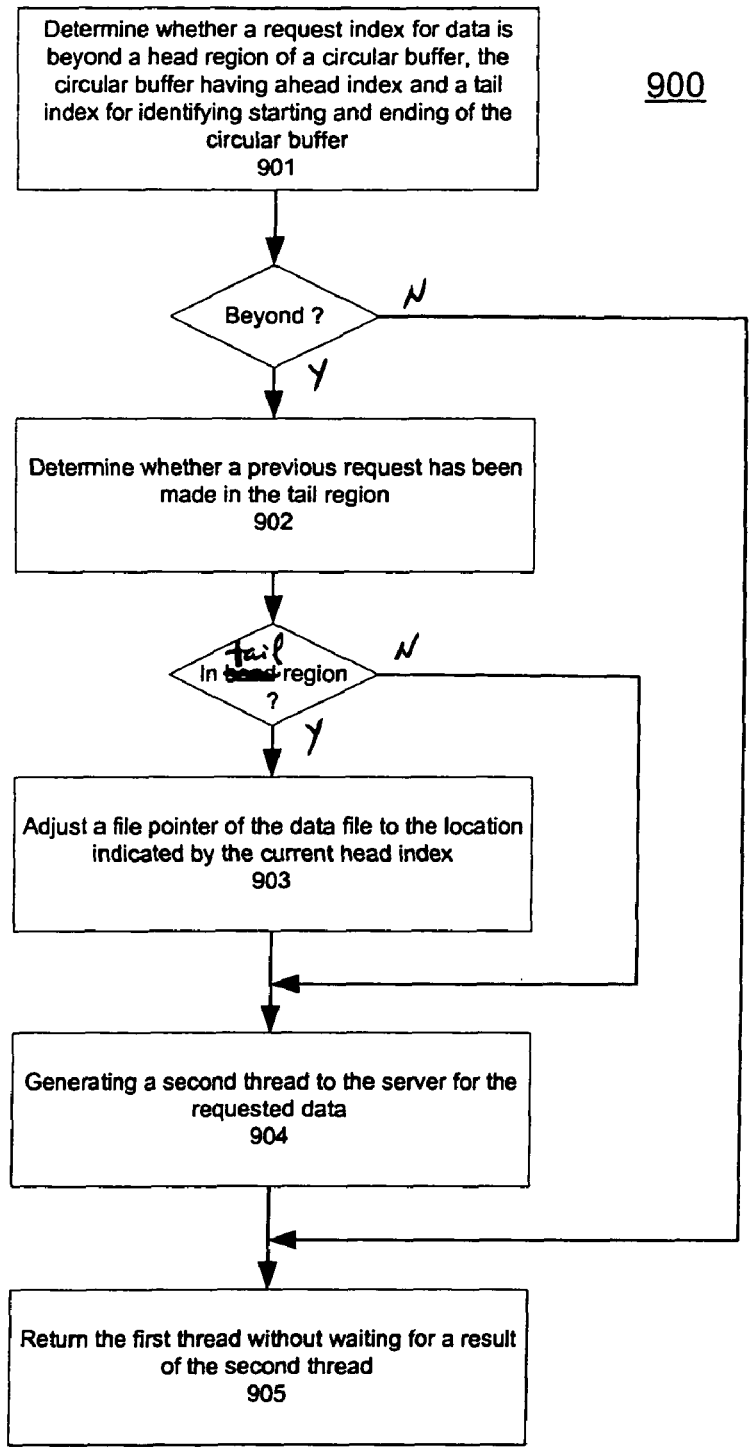
FIG. 9 is a flow diagram illustrating an exemplary process for retrieving data according to another embodiment of the invention.

FIG. 9 is a flow diagram illustrating an exemplary process for retrieving data according to another embodiment of the invention. Exemplary process 900 may be performed by a processing logic that may include hardware (circuitry, dedicated logic, etc.), software (such as is run on a dedicated machine), or a combination of both. For example, according to one embodiment, exemplary process 900 may be performed as a part of process block 703 of FIG. 7.

Referring to FIG. 9, when a request for a record is received from a client, at block 901, the processing logic determines whether a request index associated with the request is beyond a head region of a circular buffer, where the circular buffer includes a head index and a tail index for identifying the head and tail regions. If the request index is beyond the head region of the circular buffer, at block 902, the processing logic determines whether a previous request has been made in the tail region. In one embodiment, the request index is compared with a requested start index and a requested end index representing the starting and ending positions of the previous request to determine whether the previous request was made in the head region, which are maintained when the previous request was made. If the previous request was made in the tail region, at block 903, a file pointer of the data file stored in the server may be adjusted to a position corresponding to the current head index of the circular buffer. At block 904, a second thread is generated to acquire the requested records. Thereafter, at block 905, the first thread is returned while the second thread is pending. Other operations may also be performed.

Figure 10:
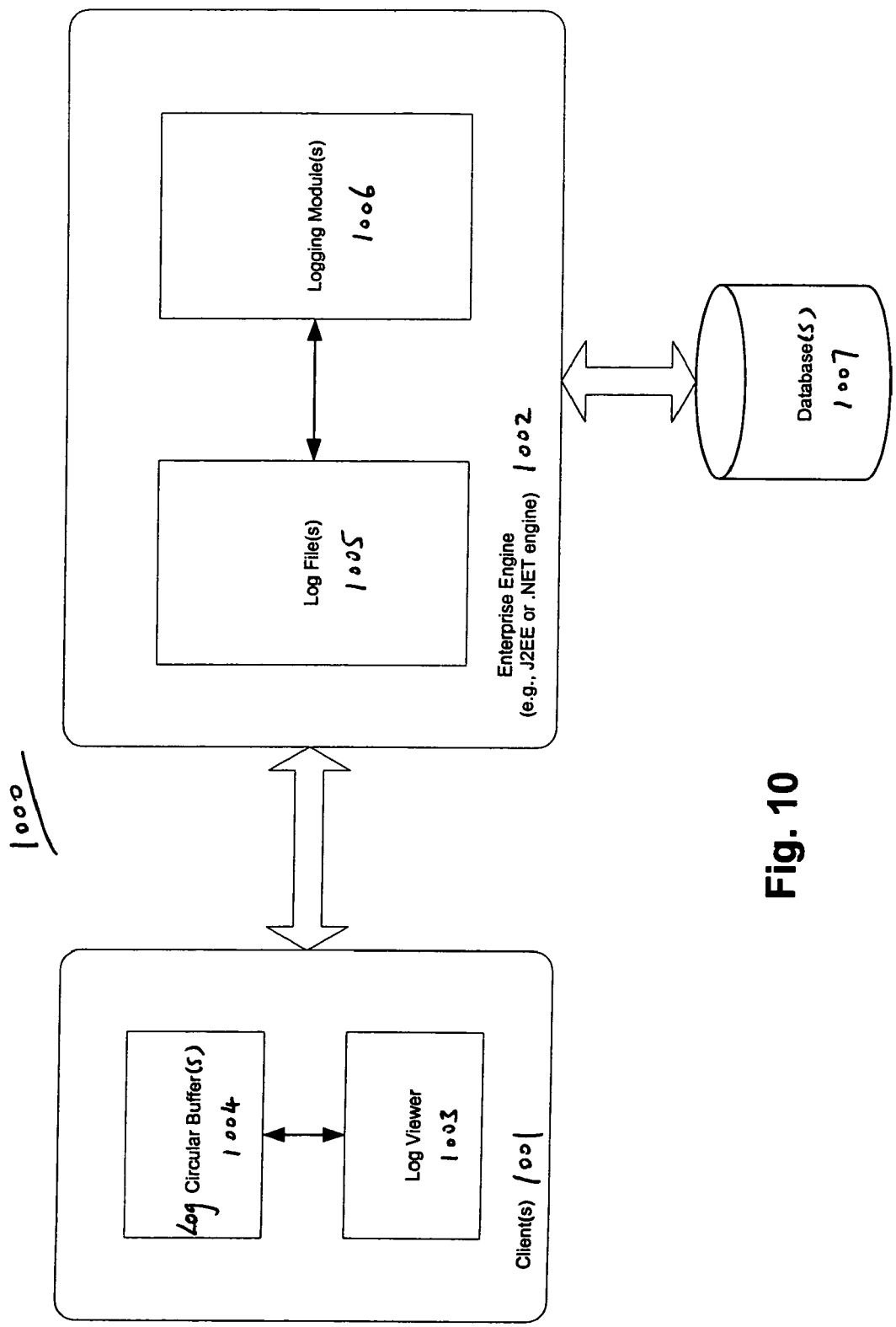
FIG. 10 is a block diagram illustrating an exemplary enterprise system according to one embodiment of the invention.

FIG. 10 is a block diagram illustrating an exemplary enterprise system according to one embodiment of the invention. Referring to FIG. 10, the exemplary system 1000 includes one or more clients 1001 communicatively coupled to an enterprise engine 1002 over a network. In one embodiment, the enterprise engine 1002 includes, but is not limited to, a logging module 1006 and one or more log files 1005 for storing log records. The log files 1005 may be stored in one or more databases 1007, which may reside locally or remotely. The logging module 1006 may include one or more processes executed by an operating system within the enterprise engine 1002 to log and store log records in the log files 1005. The logging module 1006 may be a part of logging system implemented within the enterprise engine 1002.

In one embodiment, client 1001 may include one or more log buffers 1004, which may be circular buffer similar to those described above. Client 1001 may also include a log viewer 1003 including a GUI to view at least a portion of log records maintained by the log buffer(s) 1004. For example, log viewer 1003 may be implemented as GUI 103 of FIG. 1 and log buffer(s) 1004 may be implemented as buffer 104 of FIG. 1, while log file(s) 1005 may be implemented as data file(s) 105 of FIG. 1.

According to one embodiment, similar those described above, in response to receiving a request for a record via a first thread from log viewer 1003, the log circular buffer 1004 determines whether the circular buffer 1004 contains the requested record. If the log circular buffer 1004 contains the requested record, the requested record is returned substantially immediately to the client via the same thread. If the log circular buffer 1004 does not contain the requested record, a second thread may be launched to retrieve the requested record from log file(s) 1005. While a result of the second thread is pending, the log circular buffer 1004 returns the first thread to the client, such that the client would not be held up. Furthermore, before firing the second thread, the log circular buffer determines whether a previous request has been made for the requested record. If the previous request has been made, there is no need to launch the second thread. Instead, the log circular buffer simply returns the first thread and waits for a result of a thread associated with the previous request to return from the server. The first and second threads are executed independently and asynchronously. Once the result of the second thread is returned from the server 1002, the client 1001 is notified.

The operating system running within either the client 1001 and the server 1002 may be a Windows operating system from Microsoft Corporation or a MacOS operating system from Apple Computer. Alternatively, the operating system may be a Unix, a Linux, or an embedded operating system from a variety of vendors. The enterprise engine 1002 may be implemented within a data processing system, such as, for example, exemplary system 1100 of FIG. 11, which will be described in detail further below. Other configurations may exist.

Figure 11:
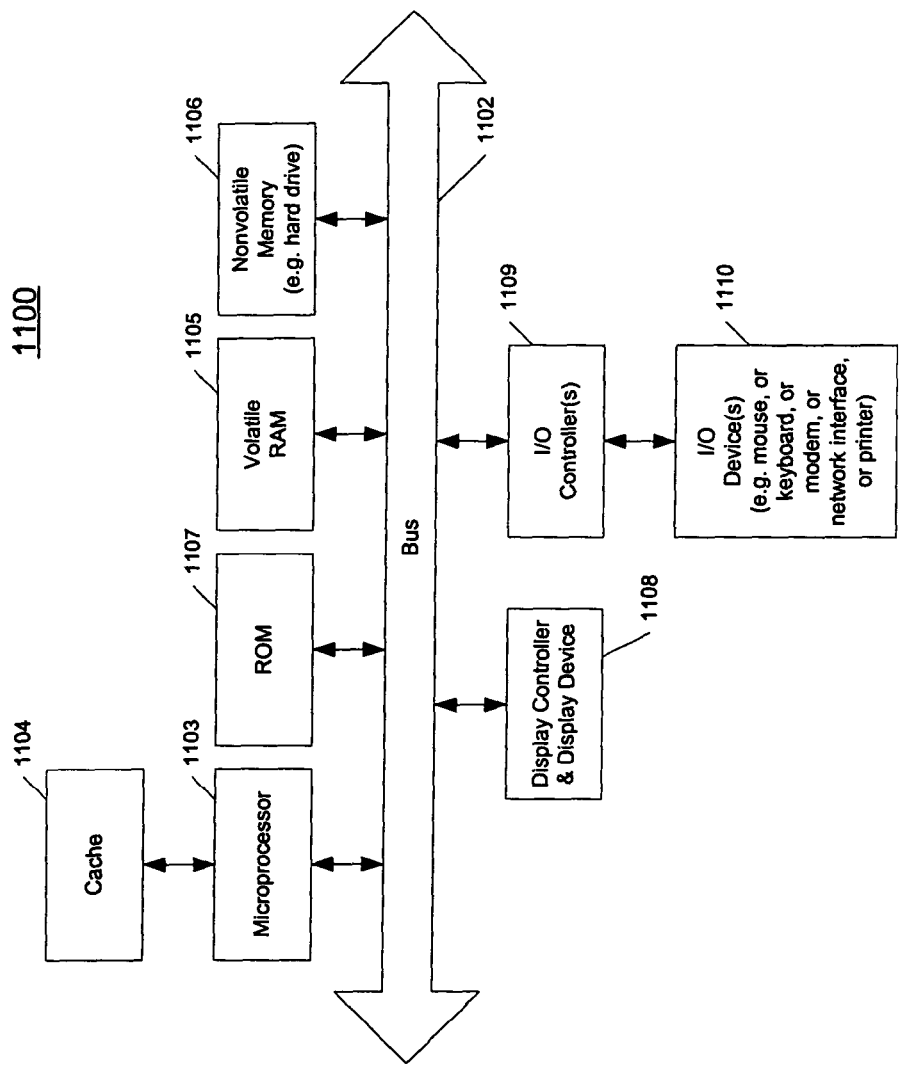
FIG. 11 is a block diagram of a data processing system which may be used with one embodiment of the invention.

FIG. 11 is a block diagram of a data processing system, which may be used with one embodiment of the invention. For example, the system 1100 shown in FIG. 11 may be used as an enterprise computing engine or a client, such as, for example, client 101 or server 102 of FIG. 1, and/or client 1001 and enterprise engine 1002 of FIG. 10.

Note that while FIG. 11 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 11 may, for example, be a J2EE engine or a .NET framework engine.

As shown in FIG. 11, the computer system 1100, which is a form of a data processing system, includes a bus 1102 which is coupled to a microprocessor 1103 and a ROM 1107, a volatile RAM 1105, and a non-volatile memory 1106. The microprocessor 1103, which may be a PowerPC microprocessor from Motorola, Inc. or IBM, is coupled to cache memory 1104 as shown in the example of FIG. 11. Alternatively, processor 1103 may be a Pentium Processor from Intel Corporation.

The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices which are well-known in the art. Typically, the input/output devices 1110 are coupled to the system through input/output controllers 1109.

The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 11 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals.

According to one embodiment, in response to a request for deploying an enterprise component, a log configuration service (e.g., log configuration service 402) may be executed from the memory 1105 to cause processor 1103 to perform logging and tracing configurations illustrated by one or more processes set forth above. Other operations may be performed as well.

Thus, a mechanism for retrieving data over a network using an asynchronous buffer has been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:
   in response to a request for first data from a client via a first thread, determining whether a local circular buffer contains the requested first data, the local circular buffer having a head region and a tail region for identifying a head and a tail of the local circular buffer respectively, the local circular buffer arranged to wrap around itself both past the tail and past the head thus allowing reading and writing of data past the tail and past the head responsive to a data scrolling activity at the client, the local circular buffer containing a portion of a data file maintained by a server over a network;

based on a determination that the local circular buffer does not contain the requested first data, generating a second thread to the server over the network to request the first data;

determining whether a location of a previous request for data associated with a request index is related to the head region of the local circular buffer;

adjusting a file pointer of the file of the server to a location substantially corresponding to a location associated with a tail index prior to generating the second thread; and returning the first thread to the client while waiting for a result of the second thread from the server.

2. The method of claim 1, further comprising:

receiving a second data from the server over the network in response to the second thread, the second data including the requested first data;

storing the second data in the local circular buffer; and notifying the client indicating arrival of the requested first data to enable the client to retrieve the requested first data from the local circular buffer.

3. The method of claim 2, wherein the second data includes additional data other than the requested first data, and wherein the additional data is anticipated that the client is to request subsequently.

4. The method of claim 1, further comprising returning the requested first data from the local circular buffer to the client via the first thread if the local circular buffer contains the requested first data.

5. The method of claim 1, wherein determining whether the first data is in the local circular buffer comprises:

determining whether the first data is within one of the head and tail regions of the local circular buffer; and returning the requested first data from the local circular buffer to the client via the first thread if the first data is within one of the head and tail regions of the local circular buffer.

6. The method of claim 1, wherein the request for the first data is identified by a request index, wherein the head region and the tail region of the local circular buffer are identified by a head index and a tail index respectively, and wherein determining whether the first data is within one of the head and tail regions of the local circular buffer is performed based on the request index, head index, and tail index according to a mathematical formula.

7. The method of claim 6, further comprising determining whether the request index is beyond the tail region by comparing the request index with the tail index, wherein the second thread is generated if the request index is beyond the tail region of the local circular buffer.

8. The method of claim 1, further comprising:

determining whether a previous request for data associated with a request index has been made to the server via a third thread and a result of the third thread is still pending; and returning the first thread indicating the first data is pending without generating the second thread if the result of the third thread is still pending.

9. The method of claim 8, further comprising:

maintaining a requested start index and a requested end index for the previous request while the third thread is pending; and determining whether the request index is within the requested start index and the requested end index in order to determine whether a previous request has been made.

10. The method of claim 6, further comprising determining whether the request index is beyond the head region of the local circular buffer by comparing the request index with the head index, wherein the second thread is generated if the request index is beyond the head region.

11. The method of claim 6, further comprising:

determining whether a previous request for data associated with the request index has been made to the server via a third thread and a result of the third thread is still pending; and returning the first thread indicating the first data is pending without generating the second thread if the result of the third thread is still pending.

12. The method of claim 6, further comprising:

determining whether a location of the previous request is related to the tail region of the local circular buffer; and adjusting a file pointer of the file of the server to a location substantially corresponding to a location associated with the head index prior to generating the second thread.

13. The method of claim 11, further comprising:

maintaining a requested start index and a requested end index for the previous request while the third thread is pending; and determining whether the request index is within the requested start index and the requested end index in order to determine whether a previous request has been made.

14. The method of claim 1, wherein the client includes a graphical user interface (GUI) that displays a portion of data maintained in the local circular buffer, and wherein the server is an enterprise server.

15. The method of claim 14, wherein the GUI is a part of a log viewer and the data file stored in the server is a part of a log file for logging enterprise transactions of the enterprise server.

16. A non-transitory machine-readable storage medium containing instructions that, when executed by a processor, causes the processor to perform a method for processing messages, the method comprising:

in response to a request for first data from a client via a first thread, determining whether a local-circular buffer contains the requested first data, the local circular buffer having a head region and a tail region for identifying a head and a tail of the local circular buffer respectively, the local circular buffer arranged to wrap around itself both past the tail and past the head thus allowing reading and writing of data past the tail and past the head responsive to a data scrolling activity at the client, the local circular buffer containing a portion of a data file maintained by a server over a network;

based on a determination that the local circular buffer does not contain the requested first data, generating a second thread to the server over the network to request the first data;

determining whether a location of a previous request for data associated with a request index is related to the head region of the local circular buffer;

adjusting a file pointer of the file of the server to a location substantially corresponding to a location associated with a tail index prior to generating the second thread; and returning the first thread to the client while waiting for a result of the second thread from the server.

17. The non-transitory machine-readable storage medium of claim 16, wherein the method further comprises:

receiving a second data from the server over the network in response to the second thread, the second data including the requested first data;

storing the second data in the local circular buffer; and notifying the client indicating arrival of the requested first data to enable the client to retrieve the requested first data from the local circular buffer.

18. The non-transitory machine-readable storage medium of claim 17, wherein the second data includes additional data other than the requested first data, and wherein the additional data is anticipated that the client is to request subsequently.

19. A data processing system, comprising:

a processor; and a memory coupled to the processor for storing instructions, when executed from the memory, causes the processor to perform operations including:

in response to a request for first data from a client via a first thread, determine whether a local circular buffer contains the requested first data, the local circular buffer having a head region and a tail region for identifying a head and a tail of the local circular buffer respectively, the local circular buffer arranged to wrap around itself both past the tail and past the head thus allowing reading and writing of data past the tail and past the head responsive to a data scrolling activity at the client, the local circular buffer containing a portion of a data file maintained by a server over a network;

based on a determination that the local circular buffer does not contain the requested first data, generate a second thread to the server over the network to request the first data;

determine whether a location of a previous request for data associated with a request index is related to the head region of the local circular buffer;

adjust a file pointer of the file of the server to a location substantially corresponding to a location associated with a tail index prior to generating the second thread; and return the first thread to the client while waiting for a result of the second thread from the server.

* * * * *